(12) United States Patent
Winter et al.

(10) Patent No.: US 10,926,224 B2
(45) Date of Patent: Feb. 23, 2021

(54) SPIRAL-WOUND ELECTRODIALYSIS MODULE

(71) Applicant: Massachusetts Institute of Technology, Cambridge, MA (US)

(72) Inventors: Amos G. Winter, Somerville, MA (US); Natasha Catherine Wright, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 111 days.

(21) Appl. No.: 16/161,623

(22) Filed: Oct. 16, 2018

(65) Prior Publication Data

US 2019/0111393 A1 Apr. 18, 2019

Related U.S. Application Data

(60) Provisional application No. 62/572,844, filed on Oct. 16, 2017.

(51) Int. Cl.

| | |
|---|---|
| *B01D 61/46* | (2006.01) |
| *B01D 61/44* | (2006.01) |
| *B01D 63/10* | (2006.01) |
| *C02F 1/469* | (2006.01) |
| *C02F 103/06* | (2006.01) |

(52) U.S. Cl.
CPC ............. B01D 61/46 (2013.01); B01D 61/44 (2013.01); B01D 63/10 (2013.01); C02F 1/4693 (2013.01); *B01D 2313/345* (2013.01); *B01D 2325/42* (2013.01); *C02F 2103/06* (2013.01)

(58) Field of Classification Search
CPC ..................................................... B01D 63/10
See application file for complete search history.

(56) References Cited

U.S. PATENT DOCUMENTS

| | | | |
|---|---|---|---|
| 7,662,267 B2 | 2/2010 | Carson et al. | |
| 2004/0060823 A1* | 4/2004 | Carson | B01D 61/54 204/627 |
| 2007/0163891 A1* | 7/2007 | Menzel | B01D 61/48 205/742 |
| 2007/0215474 A1 | 9/2007 | Batchelder et al. | |
| 2011/0120886 A1 | 5/2011 | Jha et al. | |

OTHER PUBLICATIONS

Wen et al, "Spirally Wounded Electrodialysis (SpED) Modules," Desalination 101 (1995) 79-91 (Year: 1995).*
USPTO, International Search Report and Written Opinion for PCT/US18/56113 (corresponding PCT application) (dated Dec. 10, 2018).
G. Solt and T. Wen, "Modeling the Spirally Wound Electrodialysis Process—Single Start, Parallel Flow", Institution of chemical Engineers Symposium Series No. 127 (1992).
T. Wen, G.Solt, and Y. Sun, "Spirally Wound Electrodialysis (SpED) Modules", 101 Desalination 79-91 (1995).

* cited by examiner

*Primary Examiner* — Salil Jain
(74) *Attorney, Agent, or Firm* — Modern Times Legal; Robert J. Sayre

(57) ABSTRACT

A spiral-wound electrodialysis module includes an inner electrode positioned about a central axis and an outer electrode surrounding the inner electrode. Ion exchange membranes are arranged in a stack, and each membrane extends in a spiral outward from an inner position proximate the inner electrode to an outer position proximate the outer electrode. The spirals expand outward at a greater-than-linear rate as a function of angle along a length of the spiral from the inner positions to the outer positions.

20 Claims, 4 Drawing Sheets

SPIRAL-WOUND ELECTRODIALYSIS MODULE

RELATED APPLICATION

This application claims the benefit of U.S. Provisional Application No. 62/572,844, filed 16 Oct. 2017, the entire content of which is incorporated herein by reference.

BACKGROUND

Electrodialysis (ED) is a desalination technology that uses an electric current acting over a series of anion and cation exchange membranes (AEM and CEM, respectively) to drive transport of salt ions.

While improvements have been made to individual components, the basic architecture of commercial electrodialysis (ED) stacks has not significantly changed since the concept of a multi-compartment ED cell having alternating cation and anion exchange membranes was first proposed by Meyer and Strauss in 1940 [Meyer and Strauss, "La permeabilite des membranes. VI. Sur le passage du courant electrique a travers des membranes selectives," 23 Helv. Chim. Actra. 795-800 (1940)]. Commercial ED stacks manufactured, for example, by GE Power and Water and Hangzhou Iontech have a similar architecture in which flat, rectangular membranes are sandwiched between two or more electrodes.

For any given ED stack having a set membrane area, the desalination rate is maximized when the applied current density (the amount of electric current per unit cross-sectional area of membrane) is maximized. However, this applied current density must lie below the limiting current density (LCD), the current density that results in a zero ion concentration at the membrane surface in the diluate channel. The LCD is governed by diluate stream velocity, salt concentration, and channel spacer geometry. Studies that investigate the cost-optimal design of flat stack architectures reveal that if membrane costs are dominant over pumping costs (both capital and energetic), then operating close to the LCD at all points in the flow path within an ED stack is preferred [Hong-Joo Lee, et al., "Designing of an electrodialysis desalination plant," 142 Desalination 267-286 (2002), and Sahil R. Shah, Natasha C. Wright, Patrick A. Nepsky, and Amos G. Winter, "Cost-optimal design of a batch electrodialysis system for domestic desalination of brackish groundwater," 443 Desalination 198-211 (2018)].

Commercial ED systems typically run in continuous mode, where the flow path is designed to achieve the desired concentration reduction in a single pass through the system. In order to operate close to the LCD throughout the process, individual ED stacks are staged in series with decreasing applied voltage over each successive stage. As a result of this staging, the applied current density decreases as the diluate solution concentration and LCD also decrease. While it is possible to apply the voltages in the system such that the applied and adjusted limiting current densities (adjusted down from the limiting current to provide a margin of safety) match at the outlet of each stack in the series, the applied current density will be lower than the LCD at all other locations in the stacks due to the non-linear relationship between salt concentration and electrical resistance. Thus, conventional ED stacks operating under constant voltage cannot maintain matching applied current density and LCD at all locations along the flow path.

In a spiral-wound ED module, the diluate and concentrate streams flow in parallel from a perforated inner electrode to an outer electrode along a spiral path. FIG. 1 shows how the feed water enters the alternating CEMs 16 and AEMs 18 and separates into alternating diluate and concentrate streams 24 and 22. A voltage applied across the anode 12 and cathode 14 (in other embodiments, the cathode 14 can be perforated and at the center with the anode 12 being at the perimeter) drives a current, I, that separates the feed 20 into the diluate and concentrate streams 24 and 22. Both the limiting and applied current densities ($i_{lim}$ and i, respectively) decrease as the diluate concentration, $C_d$, decreases.

This stack configuration is of interest because the applied current density decreases with each successive revolution of the spiral by nature of the increasing effective membrane area through which the current must pass. The applied current density thus decreases as the concentration in the diluate stream and associated LCD decreases. By matching the applied current density as closely as possible to the LCD at any given location in a stack, the required amount of membrane area is minimized.

Arden and Solt first patented the concept of a spiral-wound ED module in 1953 [GB 759275 A]. Solt went on to analytically model both parallel and crossflow configurations with Wen and Sun in the early 1990s [G. S. Solt, et al., "Modeling the spirally wound electrodialysis process: Single start, parallel flow," 127 Institution of Chemical Engineers Symposium Series 11-22 (1992), and T. Wen, et al., "Modeling the cross flow spirally wound electrodialysis SpED process," 103 Desalination 165-176 (1995)]. Wen, et al., also tested a parallel flow spiral-wound ED stack experimentally [T. Wen, et al., "Spirally wound electrodialysis SpED modules," 101 Desalination 79-91 (1995)]; however, the performance was not compared to the analytical model and disclosure was lacking as to design of the spiral. Previous work has focused on the Archimedean spiral (which is the locus of points corresponding to the locations over time of a point moving away from a fixed point with a constant speed along a line that rotates with constant angular velocity or, when defined in polar coordinates (r, θ), the spiral can be described by r=a+bθ, where a and b are real numbers).

SUMMARY

A spiral-wound electrodialysis module and methods for electrodialysis are described herein, where various embodiments of the apparatus and methods may include some or all of the elements, features and steps described below.

A spiral-wound electrodialysis module includes an inner electrode positioned about a central axis and an outer electrode surrounding the inner electrode. Ion exchange membranes are arranged in a stack, and each membrane extends in a spiral outward from an inner position proximate the inner electrode to an outer position proximate the outer electrode. The spirals expand outward at a greater-than-linear rate as a function of angle along a length of the spiral from the inner positions to the outer positions (in a non-Archimedean spiral) and/or expand outward at a linear rate over less than five revolutions (e.g., with no more than 1, 2, 3, or 4 revolutions) from the inner to the outer positions (e.g., in the form of an Archimedean spiral).

The spiral shape of the non-Archimedean membranes can substantially match the following function:

$$r(\beta) = \frac{r_0}{1 - \beta\left(\frac{1 - CR^{-1}}{\beta_f}\right)},$$

where r(β) represents local spiral radius as a function of angle, $r_0$ represents a radius of the inner electrode, β represents local spiral angle, CR represents concentration ratio (i.e., the concentration of the feed water divided by the concentration of the diluate/product water), and $β_f$ represents angle at an outer end of the spiral.

In additional embodiments, the spirals are shaped so as to generate an applied current density that is within 60%, within 40%, within 30%, within 20%, within 10%, or even within 5% of limiting current density at each location in the stack.

The ion exchange membranes can comprise a plurality of cation exchange membranes and a plurality of anion exchange membranes, wherein the cation exchange membranes alternate in sequence with the anion exchange membranes. Channels configured for fluid flow can be defined between adjacent membranes, wherein the channels include diluate channels and concentrate channels that alternate in sequence. Moreover, fluid pumps can be configured to pump both a diluate stream and a concentrate stream in parallel flow along the spiral pathways from the inner to outer electrodes or to pump the diluate stream to flow from the inner electrode to the outer electrode along a spiral pathway and to pump the concentrate stream to flow in a cross-flow orientation (parallel to the central axis) or in a counter-flow orientation relative to the diluate stream.

In a method for performing electrodialysis using the spiral-wound electrodialysis module, feed liquid is flowed from a central channel through an inner electrode to a plurality of channels, including alternating diluate channels and concentrate channels, defined between the ion exchange membranes. A voltage potential is applied across the inner and outer electrode. Ions are drawn by the charges of the electrodes to selectively flow through the ion exchange membranes from the diluate channels into the concentrate channels. A concentrate solution is then extracted from the concentrate channels; and a diluate solution is extracted from the diluate channels, wherein the concentrate solution has a greater salinity than the diluate solution.

Spiral-wound electrodialysis (ED) modules are of interest because, when the diluate and stream flows from the inner electrode to the outer electrode along a spiral path, the applied current density decreases as the concentration in the diluate stream and associated limiting current density (LCD) decrease. By matching the applied current density as closely as possible to the LCD at any given location in a stack (e.g., within 5, 10, 20%, 30%, 40%, or 60%), the required amount of membrane area is minimized, reducing capital cost. Presented herein is an analytical model for a spiral-wound ED module and experimental validation of that model using a prototype stack with two cell pairs and four revolutions. A constant voltage was applied, and the total current and stream conductivities at mid-stack and at the output were recorded. Experimental results agreed with the model for all parameters to within 15%. The model was used to explore the most cost-effective spiral stack designs for desalting brackish groundwater, examining both a standard Archimedean spiral (as is common for spiral-wound RO modules) and an ideal non-Archimedean spiral. The ideal spiral shape was found to reduce total cost by 21% and capital cost by 39% with respect to an Archimedean spiral.

The analytical model for a parallel flow, spiral-wound electrodialysis (ED) module presented herein builds upon existing work by accounting for channel properties (such as spacer geometry) and LCD. Given a set membrane and spacer type, the shape of the Archimedean spiral that allows for matching applied and limiting current densities at both the inner and outer electrode is a function of the feed and product water concentrations, the number of revolutions of the spiral, the number of cell pairs, and linear flow velocity, alone.

Forms of electrodialysis in which the ED modules and methods, described herein, can be used include electrodionization (EDI), which is electrodialysis performed with a resin in the channels between the membranes.

Figure 1:
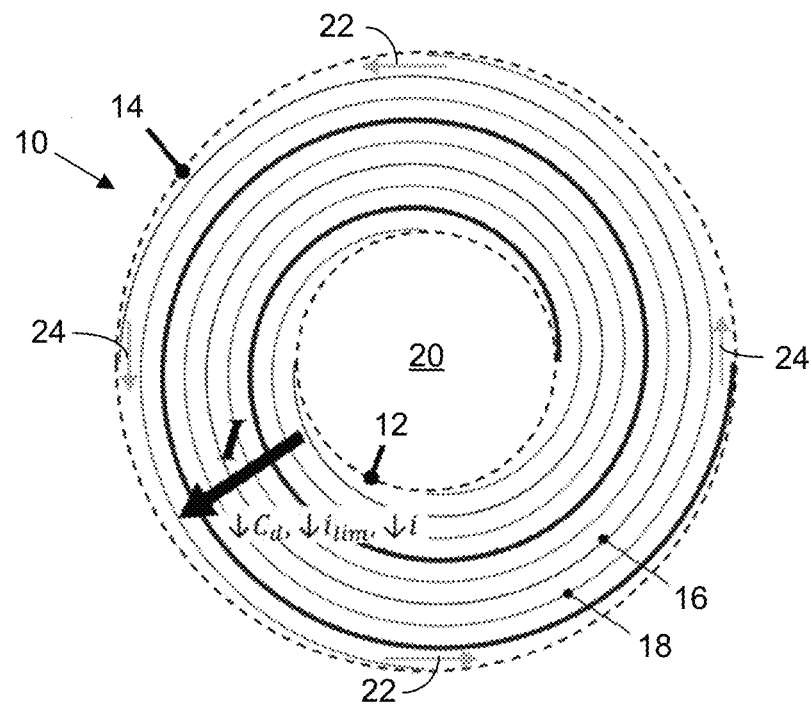
FIG. 1 shows a spiral-wound ED module 10 in which feed water 20 entering through a perforated center electrode 12 flows between alternating anion and cation exchange membranes 18 and 16, which have been wound in a spiral around the center electrode 12.

In the accompanying drawings, like reference characters refer to the same or similar parts throughout the different views. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

The discussion that follows expands on the previous literature by incorporating calculations of the limiting current density (LCD), electrical resistance in the fluid boundary layer, and the effects of spacer geometry into the analytical model. Incorporation of the LCD provides an important advantage, as the proposed benefit of a spiral stack is to maintain current density near limiting at all points along the spiral. In ideal spiral configurations described herein, the radius varies along the length of the spiral to ensure that the applied current density and LCD not only decrease with each successive revolution, but match in value along the entire length of the spiral—a condition that is not possible to achieve with a standard Archimedean spiral.

The analytical model presented herein can be based on an existing model for standard flat stack configurations developed and experimentally validated by the authors [Natasha C. Wright, Sahil R. Shah, Susan E. Amrose, Amos G. Winter V "Robust model of brackish water electrodialysis desalination with experimental comparison at different size scales," 443 Desalination 27-43 (2018)]. Modifications to that model that are implemented to represent the spiral architecture will be discussed here.

The model describes a spiral design with a known inner electrode radius, $r_0$; a number of cell pairs, N; and a total number of revolutions, S, and calculates the desalination rate, membrane and electrode area, and energy consumption. Further below, we discuss the inverse problem of determining the optimal number of cell pairs, the number of revolutions, the inner electrode radius, and the applied voltage such that matching between LCD and applied current density occurs at the beginning and end of the spiral (using an Archimedean spiral shape) and then along the length of the entire spiral (using an ideal non-Archimedean spiral shape).

Figure 2:
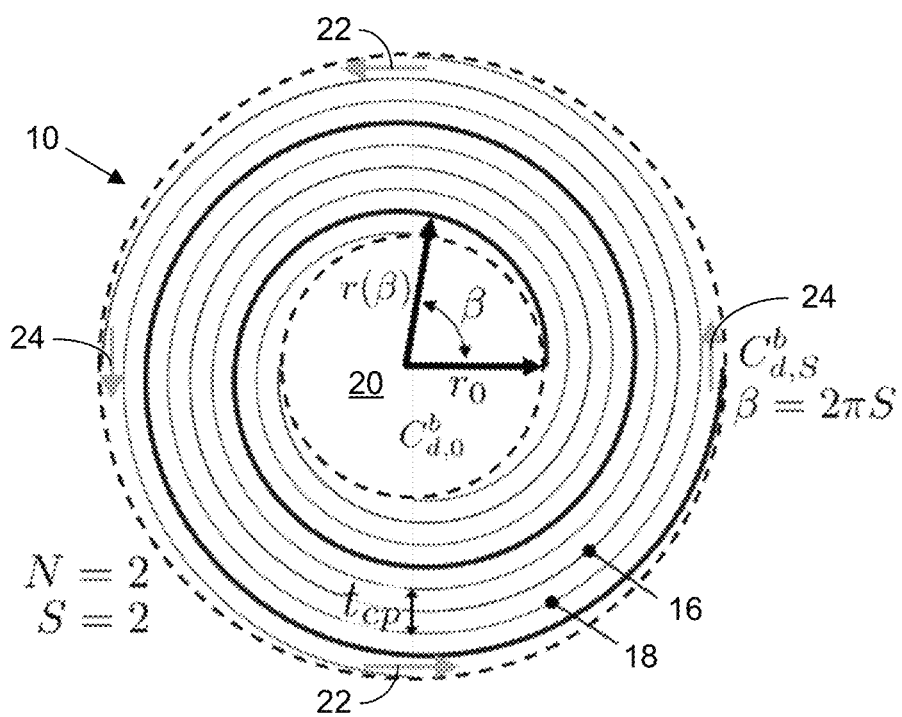
FIG. 2 shows another view of the spiral-wound ED module 10 of FIG. 1.

An Archimedean spiral (also called an arithmetic spiral) is a spiral in which the radius increases by a constant value with each successive revolution of the spiral (i.e., the radius increases linearly moving outward along the length of the spiral). The Archimedean spiral thus defines the shape that would be achieved if standard ED cell pairs were wrapped around a center electrode since the thickness of the cell pairs remains constant. This shape is also employed by spiral-wound RO modules. The local radius of an ED stack wrapped as an Archimedean spiral is defined in polar coordinates as follows:

$$r(\beta) = r_0 + \frac{Nt_{cp}}{2\pi}\beta, \qquad (1)$$

where $r_0$ is the radius of the center electrode; $\beta$ is the angle around the spiral; and $t_{cp}$ is the thickness of a single cell pair, given as the sum of channel heights, h, and the AEM/CEM membrane thicknesses ($l_a$ and $l_c$, respectively) such that $t_{cp}=2h+l_a+l_c$. FIG. 2 shows a two-cell pair (N=2), two-revolution (S=2) Archimedean spiral, where the radius, r, increases at a constant rate equal to the cell pair thickness, $t_{cp}$, with each successive revolution. The Archimedean spiral ends at a final angle of $\beta=2\pi S$. The bulk concentration of the diluate 24 at the end of any given revolution, s, is denoted as $C_{d,s}^b$.

The length of a single membrane 16/18 is found using the following equation for the arc length, L, of a curve in polar coordinates:

$$L = \int_0^{\beta_f} \sqrt{r(\beta) + \frac{dr}{d\beta}}\, d\beta, \quad (2)$$

where the integral is evaluated from 0 to $\beta_f=2\pi S$, the angle at the end of the spiral. The total volumetric flow rate of the diluate, $Q_d$ (m$^3$/s), is:

$$Q_d = NWhu_{ch}\varepsilon, \quad (3)$$

where W is the width of a single membrane (m), h is the channel height (m), $u_{ch}$ is the spacer-filled channel velocity (m/s), and $\varepsilon$ is the void fraction. The total membrane area, $A_{total}$, in the spiral is then given by the following equation:

$$A_{total} = 2NLW, \quad (4)$$

while the projected area for any given membrane segment, j, covering less than $2\pi$ radians, $A_j$, can be approximated by the following equation:

$$A_j = (\beta_2 - \beta_1) r(\beta_1) W, \quad (5)$$

where r is evaluated at $\beta_1$. As $(\beta_1 - \beta_2)$ goes to zero, the stack is segmented into smaller paths for the current to flow, and the discrete analysis approaches the continuous solution.

We begin by neglecting the contribution of back-diffusion due to the ionic concentration gradient between the concentrate and diluate channels. Doing so allows us to solve the set of equations in this section without the use of an iterative solver. The effect that this assumption has on predicted salt removal rates is discussed, further below. The quantity of salt removed in a single pass through the spiral is then a result of migration due to the applied current, I, alone and is calculated by the following equation:

$$(C_{d,0}^c - C_{d,S}^b) = \frac{I\phi SN}{zFQ_d}, \quad (6)$$

where $C_{d,0}^b$ is the feed water salinity in the bulk solution (mol/m$^3$) at the center electrode; $C_{d,S}^b$ is the final diluate salinity in the bulk solution (mol/m$^3$) as it leaves the stack at the final revolution; S, $\phi$ is the current leakage factor; z is the ion charge number; and F is Faraday's constant (C/mol).

Because the same amount of current must pass through each successive revolution of the spiral, the change in concentration must also be the same ($C_{d,0}^b - C_{d,1}^b = C_{d,1}^b - C_{d,2}^b$). Equation 6 thus leads to the equation for the diluate concentration, $C_{d,s}^b$, in any given revolution of the spiral, $$C_{d,s}^b - C_{d,0}^b = \frac{I\phi sN}{zFQ_d}, \quad (7)$$

where s is the revolution number, counting outwards from the inner electrode.

The maximum current $I_{lim}$ that can be applied to the spiral is calculated from the limiting current density $i_{lim}$ with the following equation:

$$i_{lim} = \frac{I_{lim}}{\phi_A A} = \frac{C_d^b zFk}{t^{mem} - t_{+,-}} = \frac{C_d^b zFD_{aq} 0.29 Re_d^{0.5} Sc^{0.33}}{d_h(t^{mem} - t_{+,-})}, \quad (8)$$

where definitions of the area porosity, $\phi_A$, Reynold's number, Re, Schmidt number, Sc, mass transfer coefficient, k, hydraulic diameter, $d_h$, diffusion coefficient of the aqueous solution, $D_{aq}$, and the transport numbers, $t^{mem}$, and $t_{+,-}$ are as defined in Natasha C. Wright, Sahil R. Shah, Susan E. Amrose, and Amos G. Winter, "A robust model of brackish water electrodialysis desalination with experimental comparison at different size scales," 443 Desalination 27-43 (2018). Introducing a desired current ratio ($\gamma = I/I_{lim}$) and setting the applied current, I, in Eq. 6 equal to the adjusted limiting current, $\gamma I_{lim}$, we can solve for the inner electrode radius that would facilitate the desired current to be applied at the beginning of the flow path when $C_{d,0}^b = C_{d,0}^b$, as follows:

$$r_0 = \frac{(1 - CR^{-1})u_{ch}^{1/2}}{S}\xi, \quad (9)$$

where $$\xi = \frac{h^{3/2}\varepsilon^{3/2}\mu^{1/6}(t^{mem} - t_{+,-})}{0.29\pi\phi\gamma(2 + 8(1-\varepsilon))^{1/2}\rho^{1/6}D_{aq}^{2/3}\phi_A},$$

and where $CR = C_{d,0}^b / C_{d,S}^b$, the ratio of feed to product water concentration. Note that if a certain membrane and spacer type is assumed (properties of which are used to calculate $\xi$), the full spiral shape (Eq. 1) can be defined using only CR, the channel velocity, $u_{ch}$, the number of revolutions, S, and the number of cell pairs, N.

Just as with standard flat-stack ED architectures, the spiral ED stack is modeled as an analogous DC circuit. However, the spiral is distinct in that the current passes through the same solution S times, and the area of each successive flow channel/membrane increases as you move from the inner to outer electrode. The voltage at the electrodes, $E_{total}$, is related to the current by the following equation:

$$E_{total} = E_{el} + \frac{1}{\phi A}\sum_{j=1}^{J}\left(\frac{R_{d,j}^b + R_{d,j}^{BL} + R^{mem}}{A_{d,j}} + \frac{R_{c,j}^b + R_{c,j}^{BL} + R^{mem}}{A_{c,j}}\right) + \sum_{j=1}^{J} E_{mem,j}. \quad (10)$$

Here, j indicates the channel location such that j=1 is the diluate and concentrate channel closest to the inner electrode, and that a total of J=NS diluate channels and J=NS concentrate channels exist between the inner and outer electrode. The area resistances, $R_{d,j}^b$, $R_{d,j}^{BL}$, $R_{c,j}^b$, and $R_{c,j}^{BL}$ are associated with the bulk and boundary layer fluid in the diluate and concentrate streams, respectively (Q m$^2$). The average area resistance of the AEM and CEM is given by $R^{mem}$ ($\Omega$m$^2$). $A_{d,j}$ and $A_{c,j}$ are the projected areas of the diluate and concentrate channel (m$^2$) such that both increase as j increases, in accordance with Eq. 5. $E_{mem}$ is the potential across each membrane pair and is a function of the concentration at the membrane wall and, thus, also changes based on channel location, j. Finally, $E_{el}$ is electrode potential difference. Given a known bulk concentration and effective area for each channel location, each of the terms in Eq. 10 can be calculated as presented in Natasha C. Wright, Sahil R. Shah, Susan E. Amrose, and Amos G. Winter, "A robust model of brackish water electrodialysis desalination with experimental comparison at different size scales," 442 Desalination 27-43 (2018).

The total specific energy, $\Gamma_{total}$ (J/m³), is given by the sum of the energy required for desalination and for pumping, as follows:

$$\Gamma_{total} = \frac{IE_{total}}{Q_d} + \frac{2P}{\eta_{pump}}, \quad (11)$$

where P is the pressure drop over the stack (Pa), and where $\eta_{pump}$ is the efficiency of the pump. It is assumed that the volumetric flow rate and pressure drop is the same in the concentrate and diluate streams. The pressure drop in the spiral is modeled using the correlation developed by Ponzio, et al., "Experimental and computational investigation of heat transfer in channels filled by woven spacers," 104 International Journal of Heat and Mass Transfer 163-177 (2017), which was found to be the best match to an existing commercial ED system in [Natasha C. Wright, et al., "A robust model of brackish water electrodialysis desalination with experimental comparison at different size scales," 442 Desalination 27-43 (2018)].

Figure 3:
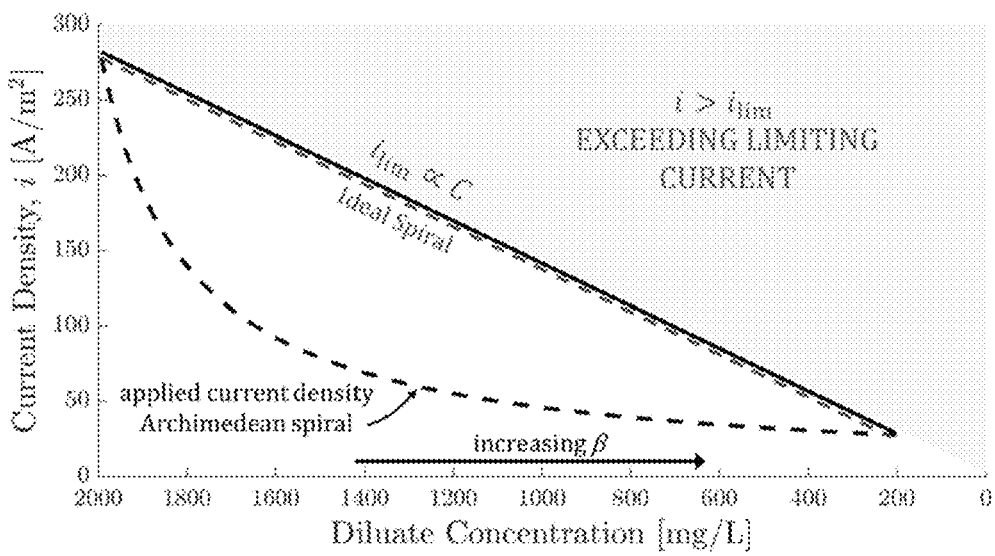
FIG. 3 is a chart plotting the adjusted current density ($0.7 \times i_{lim}$) as a function of diluate concentration for an ED module with the stack in the form of an Archimedean spiral for a particular initial-feed saline concentration, wherein applied current density for the Archimedean spiral is shown via the lower dashed line, while the limiting current density is shown via the solid line, and where these current densities are seen to match at the beginning and end of the stack but not elsewhere. The applied current density of an ideal spiral shape is shown via the upper dashed line, which continuously substantially matches the limiting current density.

Plotting the limiting current density, $i_{lim}$ (solid line), and the applied current density, i (lower dashed line), as a function of the local concentration in the spiral (FIG. 3) reveals that, although an Archimedean spiral could allow for matching applied and limiting current densities at the inlet and outlet of the stack, there remains a significant amount of wasted membrane capacity in the middle revolutions, where the applied and limiting current densities do not match. A new ideal spiral shape is required to allow for continuous matching (top dashed line).

The Archimedean spiral shape provides for a linearly decreasing diluate concentration with each successive revolution (Eq. 7), resulting in a linearly decreasing limiting current density (LCD) ($i_{lim} \propto C_d^b$, Eq. 8). However, the radius, and thus the effective area, increases linearly with each revolution of the spiral. As a result, the applied current density (which scales as I/A) will not decrease linearly as desired, rather it will decrease inversely with each successive revolution.

Combining Eqs. 7-9 and setting I (Eq. 7) equal to him (Eq. 8) for all $C_d$, we can solve for the equation of a spiral that would allow the local applied and adjusted limiting current densities to match along the entire length of the spiral. This spiral is described in polar coordinates as follows:

$$r(\beta) = \frac{r_0}{1 - \beta\left(\frac{1 - CR}{\beta_f}\right)}, \quad (12)$$

where CR is the desired concentration ratio, $C_{d,0}^b / C_{d,S}^b$.

A prototype spiral-wound ED stack was assembled and instrumented to validate the analytical model presented, above. The experimental setup and results are described, below.

Figure 4:
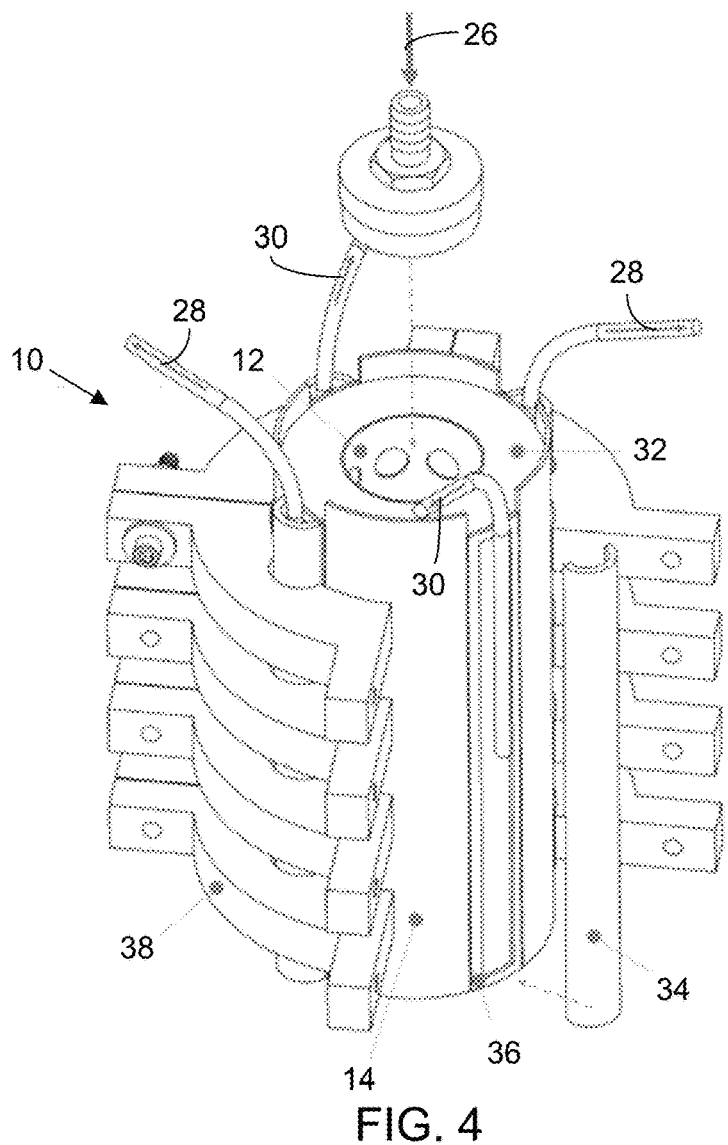
FIG. 4 is a perspective view of an embodiment of a spiral ED stack 10.

A prototype stack was assembled in three stages, and a schematic illustration of the stack is shown in FIG. 4. The prototype used for model validation was constructed by rolling two membrane/spacer cell pairs 32 (two adjacent membranes separated by a permeable spacer) around a perforated titanium inner electrode 12 to produce a spiral shape. The spiral was sealed by compressing the outer electrodes 14 against the membrane surface using clamps made out of high-density polyethylene (HDPE) and using epoxy resin to seal and cap the ends. The stack also includes a feed water inlet 26; a pair of brine outlets 30; a pair of diluate outlets 28; clear half-tubes 34 for collecting water; gasket seals 36 between the outer membrane surfaces and half-tubes 34; and clamps 38 holding the outer electrode 14, gasket seals 36, and half-tubes 34 tightly against the outermost membrane area. The final resin seal is not shown.

Table 1, below, lists the prototype stack parameters for comparison with the analytical model.

| Membrane Properties | |
| --- | --- |
| Supplier | Suez |
| AEM model | AR204SZRA |
| CEM model | CR67HMR |
| AEM resistance (Ω cm²) | 7 |
| CEM resistance (Ω cm²) | 10 |
| AEM thickness (mm) | 0.5 |
| CEM thickness (mm) | 0.6 |
| Spacer Properties | |
| Supplier | Conwed Plastics |
| Model | X0B354 |
| Filament pitch (mm) | 2.9 ± 0.1 |
| Filament diameter (mm) | 0.53 ± 0.03 |
| Spacer thickness (mm) | 0.76 ± 0.01 |
| Spacer area porosity | 0.67 ± 0.02 |
| Spiral Properties | |
| Flow path width (cm) | 17.5 |
| Flow path length (cm) | 91.4 |
| Number of cell pairs | 2 |
| Number of revolutions | 4 |
| Inner electrode radius (cm) | 2.54 |
| Channel height (mm) | 0.82 ± 0.02 |
| Calculated void fraction | 0.83 ± 0.03 |
| Electrode coverage | 0.79 |
| Combined View-Factor | 0.53 |

The inner electrode 12 was made from a grade-2 titanium tube with a 50.8-mm outer diameter and a 0.89-mm wall thickness; 6.35-mm diameter holes were added to allow water to enter the flow channels between the membranes 16 and 18. Two cell pairs (20.5-cm membrane width, 91.4-cm individual membrane length) allowed four full revolutions before reaching the outer electrode 14, which was made from 0.13-mm thick 316SS (stainless steel) foil. Anion exchange membranes (model AR204SZRA from (Suez Water Technologies & Solutions) and cation exchange membranes (model CR67HMR from (Suez Water Technologies & Solutions), both homogeneous, were used. The mesh spacer was made from Conwed Plastics' 31-mil RO spacer material.

Clear polyvinyl chloride (PVC) pipe (inner diameter 15.8 mm) cut in half lengthwise was used to collect water as it exited the stack. 316SS (stainless steel) tubing was inserted into the spiral one-third and two-thirds of the way along the membrane length and used to collect mid-stack water conductivity. Clamps were designed out of high-density polyethylene (HDPE) sheet to compress the half-tubes and their gaskets to the membranes. Finally, West System 105 and 207 epoxy resin and hardener was used to seal the ends of the stack. The epoxy serves as a replacement for the gasket material that lines the perimeter of traditional flat-stack spacer designs and ensures that the solution flows from the inner electrode to the outer electrode without coming out the ends of the spiral. Prior testing showed that the epoxy rose 1.5 cm into the flow channels. As a result, the effective membrane width decreased to 17.5 cm; W is set equal to this value in the model comparisons.

The diluate and concentrate streams 24 and 22 were run in continuous mode, flowing in a parallel configuration from the inner electrode tube 12 to the outer collection tubes 34. The feed solution 20 was prepared using deionized water and the appropriate amount of reagent grade NaCl. A Shuro 4008-101-E65 pump was used to provide feed solution to the stack 20; flow rate was controlled manually using a butterfly valve and measured using a Blue-White Industries F-1000-RB paddle wheel flowmeter (±0.2 L/min). It is assumed that the flow divides equally between the concentrate and diluate channels providing 50% recovery. A Dr. Meter HY3005F-3 power supply was used to apply a constant voltage (±0.1 V) across the electrodes and measure current (±0.01 A). The mid-stack and final water stream conductivities were recorded manually over a period of 10 minutes for each test. Conductivity (±1% of reading) and temperature (±0.1° C.) measurements were taken using a Myron 4PII meter. Experimental error bars in the following tables and figures are reported as the quadrature of the sensor accuracy (given in this paragraph) and the 95% confidence interval over 5 measurements taken over the course of each experiment.

Table 1 lists the prototype stack parameters required for comparison with the analytical model. Note that while a spacer thickness of 0.76 mm was measured prior to rolling the spacer, we were not able to roll the spiral tightly enough to ensure that the channel height was equal to the spacer thickness at all points in the stack. This divergence was confirmed when measurements taken of the outside diameter of the spiral revealed its diameter to be 94.8 mm, whereas the calculated diameter with a spacer thickness of 0.76 mm should be 92.7 mm. Instead, the average channel height was back-calculated (h=0.82 mm), and the void fraction calculation was correspondingly updated from that found in Natasha C. Wright, et al., "A robust model of brackish water electrodialysis desalination with experimental comparison at different size scales," 442 Desalination 27-43 (2018) to Eq. 13, where $d_f$ is the filament diameter (mm) and $l_f$ is the filament pitch (mm). This resulted in an estimated void fraction of $\varepsilon=0.83$, derived as follows:

$$\varepsilon = 1 - \frac{\pi d_f^2 (2l_f - d_f)}{4h l_f^2}. \tag{13}$$

Additionally, the fractional membrane area available for ion transport, which is typically set to the area porosity of the mesh spacer in the flow channels ($\phi_A=0.67$), needs to be adjusted. The outer electrode sheets covered only 79% of the outermost membrane area in order to leave space for the water collection half-tubes. It is assumed that this coverage affects the area available for ion transport in the same way as the spacer area porosity. A combined "view-factor" representing the combined effects of the spacer porosity and electrode coverage is applied, where VF=(0.79)(0.67)=0.53.

Tables 2-6 (representing tests 1-5), below, present the time-averaged results from the experiment alongside the model prediction of the same parameters for all five tests on the prototype Archimedean spiral ED stack, each of which had different feed water concentration and applied voltages. Note that the experimentally measured applied current, feed water conductivity, and flow rate served as inputs to the model; voltage potential, specific energy, and product, brine, and mid-stack conductivities were model outputs. Measurements matched the model within 1-15% (average 7%) for the voltage potential and specific energy, and within 1-11% (average 5%) for the conductivities.

TABLE 2

(test 1):

| Parameter | Experimental | Model |
|---|---|---|
| Voltage [V] | 7.5 ± 0.1 | 7.6 |
| Current [A] | 0.95 ± 0.30 | 0.95 |
| Flow rate [L/min] | 2.07 ± 0.22 | 2.07 |
| Feed conductivity [μS/cm] | 1436 ± 16 | 1436 |
| Product conductivity [μS/cm] | 971 ± 11 | 943 |
| Brine conductivity [μS/cm] | 1882 ± 21 | 1921 |
| Mid-stack diluate 1 conductivity [μS/cm] | 1240 ± 14 | 1191 |
| Mid-stack diluate 2 conductivity [μS/cm] | 1079 ± 12 | 1067 |
| Specific energy [kWh/m$^3$] | 0.06 ± 0.02 | 0.06 |

TABLE 3

(test 2):

| Parameter | Experimental | Model |
|---|---|---|
| Voltage [V] | 8.0 ± 0.1 | 8.0 |
| Current [A] | 1.44 ± 0.02 | 1.44 |
| Flow rate [L/min] | 2.03 ± 0.20 | 2.03 |
| Feed conductivity [μS/cm] | 2149 ± 23 | 2149 |
| Product conductivity [μS/cm] | 1495 ± 24 | 1402 |
| Brine conductivity [μS/cm] | 2882 ± 35 | 2883 |
| Mid-stack diluate 1 conductivity [μS/cm] | 1880 ± 29 | 1778 |
| Mid-stack diluate 2 conductivity [μS/cm] | 1638 ± 40 | 1591 |
| Specific energy [kWh/m$^3$] | 0.09 ± 0.01 | 0.09 |

TABLE 4

(test 3):

| Parameter | Experimental | Model |
|---|---|---|
| Voltage [V] | 10.0 ± 0.1 | 11.0 |
| Current [A] | 2.53 ± 0.03 | 2.53 |
| Flow rate [L/min] | 1.98 ± 0.20 | 1.98 |
| Feed conductivity [μS/cm] | 3022 ± 31 | 3022 |
| Product conductivity [μS/cm] | 1903 ± 22 | 1697 |
| Brine conductivity [μS/cm] | 4231 ± 50 | 4312 |
| Mid-stack diluate 1 conductivity [μS/cm] | 2567 ± 28 | 2365 |
| Mid-stack diluate 2 conductivity [μS/cm] | 2191 ± 38 | 2033 |
| Specific energy [kWh/m$^3$] | 0.21 ± 0.02 | 0.23 |

TABLE 5

(test 4):

| Parameter | Experimental | Model |
|---|---|---|
| Voltage [V] | 14.0 ± 0.1 | 12.8 |
| Current [A] | 2.30 ± 0.05 | 2.30 |
| Flow rate [L/min] | 2.46 ± 0.22 | 2.46 |
| Feed conductivity [μS/cm] | 1983 ± 42 | 1983 |
| Product conductivity [μS/cm] | 940 ± 45 | 988 |
| Brine conductivity [μS/cm] | 2881 ± 67 | 2950 |
| Mid-stack diluate 1 conductivity [μS/cm] | 1524 ± 34 | 1490 |
| Mid-stack diluate 2 conductivity [μS/cm] | 1246 ± 33 | 1240 |
| Specific energy [kWh/m$^3$] | 0.22 ± 0.02 | 0.20 |

TABLE 6

(test 5):

| Parameter | Experimental | Model |
|---|---|---|
| Voltage [V] | 10.0 ± 0.1 | 8.5 |
| Current [A] | 2.94 ± 0.06 | 2.94 |
| Flow rate [L/min] | 2.65 ± 0.36 | 2.65 |
| Feed conductivity [µS/cm] | 4503 ± 46 | 4503 |
| Product conductivity [µS/cm] | 3471 ± 112 | 3389 |
| Brine conductivity [µS/cm] | 5380 ± 78 | 5597 |
| Mid-stack diluate 1 conductivity [µS/cm] | 4077 ± 42 | 3948 |
| Mid-stack diluate 2 conductivity [µS/cm] | 3774 ± 44 | 3669 |
| Specific energy [kWh/m$^3$] | 0.18 ± 0.03 | 0.16 |

Figure 5:
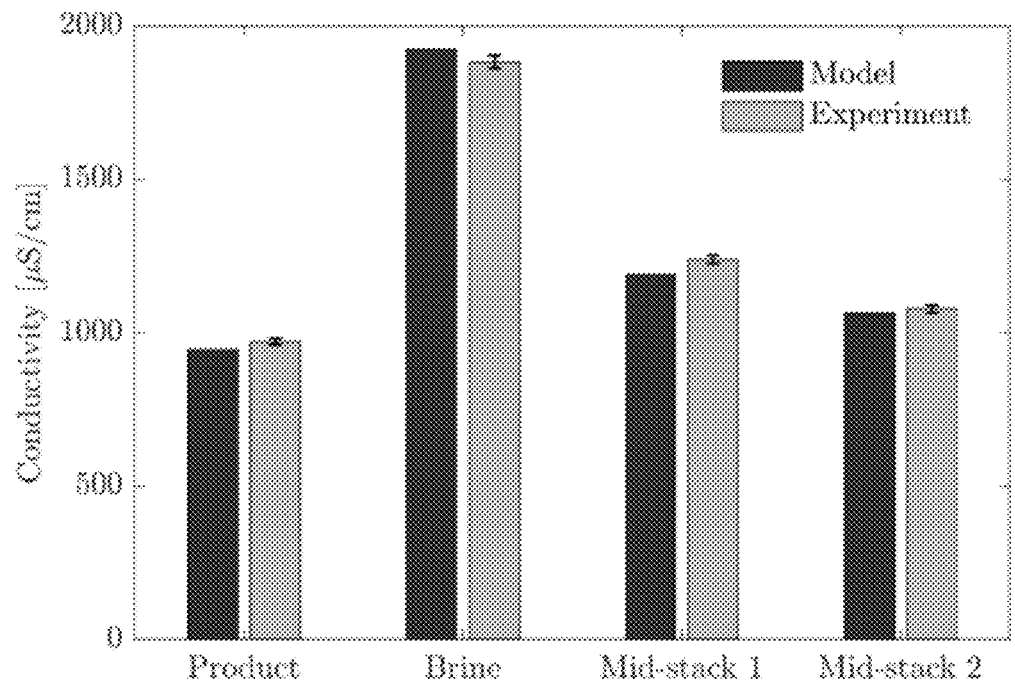
FIG. 5 is a plot of conductivity measurements for test 1 in relation to a model prediction.

The conductivity results for test 1 are shown as a bar graph in FIG. 5 in order to better visualize the trend in the data. We note, for example, that the model slightly under-predicts the experimental values in the diluate stream, while over-predicting the experimental values in the brine stream. This trend was present for all tests, except test 4. This difference is expected given the decision to neglect back diffusion in the model, allowing the set of equations presented, above, to be solved directly without iteration.

There are a number of design changes that can be incorporated in additional prototype stacks to help determine the source of any additional error between the model and the experiments, as well as to improve its overall performance and life. First, the small tubes inserted in two locations in the stack to probe for concentration can be added to every revolution and in both the diluate and concentrate streams 24 and 22, allowing for better accounting of propagated error. In these tests, the first membrane layer 16/18 did not lie perfectly flat on the inner electrode 12, resulting in a fluid layer between the two surfaces and increased electrical resistance. Better assembly of the spiral would provide for a flush fit along the center electrode 12. Additionally, the stainless-steel outer electrode 14 and titanium inner electrode 12 can be replaced with coated titanium to avoid development of pitting and rust. Alternatively, the electrodes 12 and 14 can be formed of any of a variety of other materials.

The spiral configuration of the spiral ED stack can be designed to minimize or reduce the 10-year total cost and the capital cost of the system and its operation. The calculation of capital cost includes the cost of the diluate and concentrate pumps and the stack cost (assuming $1200/m$^2$ electrode area, $40/m$^2$ membrane area, $10/m$^2$ spacer area). The total 10-year cost assumes 10,000 L/day total production and includes the capital cost, 10% interest over 5 years, $0.10/kWh for both pumping and desalination energy, and pump replacement in the fifth year.

For Archimedean spiral designs, we can ensure that the applied current density is equal to the adjusted LCD ($\gamma=0.7$) at the beginning and end of the spiral. For ideal spiral designs, the applied current density is equal to the adjusted LCD ($\gamma=0.7$) at all points along the spiral. In both cases, the spiral completes a minimum of one full revolution of ($\beta_f \geq 2\pi$). The design variables and associated bounds investigated for both cases are the channel height (0.3 mm<h<1.0 mm), the spacer-filled channel velocity (6 cm/s<$u_{ch}$<20 cm/s), and number of cell pairs (1<N<300). There are two constraints on the number of cell pairs that a single spiral can hold. Both the Archimedean and ideal spiral shapes are constrained by the number of cell pairs that can start from the inner electrode, $$2\pi r_0 \geq N t_{cp}. \tag{14}$$

The ideal spiral is additionally constrained by the number of cell pairs that can fit in the difference between the radius at $\beta=0$ and $\beta=2\pi$, $$r(\beta=2\pi) \geq N t_{cp} + r_0. \tag{15}$$

Example calculation steps used to determine the two cost objectives for the Archimedean spiral are provided, below.

1. Calculate the minimum total number of revolutions, S, required to achieve the desired concentration change, given the design variables h, $u_{ch}$, and N, where this methodology is likely to produce an S of less than five revolutions, and where it is advantageous to use the minim number of revolutions to remove a given amount of salt:

$$S = \left[\left(\frac{u_{ch}^{1/2}\xi}{t_{cp}N}\right)\left(\frac{C_{d,0}^2 - C_{d,J}^2}{C_{d,0}C_{d,J}} - 2\right)\right]^{1/2}. \tag{16}$$

2. Calculate the radius of the inner electrode, $r_0$, such that $i=i_{lim}$ at the beginning of the spiral (Eq. 9). Calculate the concentration reduction in each revolution (Eq. 7).
3. Calculate the maximum number of cell pairs that can start from the inner electrode (Eq. 14). If N<$N_{max}$, continue with the calculations.
4. Calculate the length, L, and width, W, of a single membrane (Eqs. 2 and 3).
5. Calculate the area of membrane segments (Eq. 5).
6. Calculate the current, I, that is required to achieve the desired concentration change (Eq. 6).
7. Calculate the concentration reduction in each revolution (Eq. 7).
8. Calculate the membrane potential and area resistances at each segment [Natasha C. Wright, Sahil R. Shah, Susan E. Amrose, and Amos G. Winter, "A robust model of brackish water electrodialysis desalination with experimental comparison at different size scales," 443 Desalination 27-43 (2018)] and use these values to calculate the voltage potential across the stack (Eq. 10).
9. Calculate the specific energy for desalination and pumping (Eq. 11).
10. Calculate the capital cost (CC) and 10-year total cost (TC) for the system via the following equation:

$$CC = 2\gamma_{pump} + 2NLW(\gamma_{mem} + \gamma_{sp}) + 2\pi W(r_0 + r(\beta_f))\gamma_{el}; \text{ and} \tag{17}$$

$$TC = CC + 2\gamma_{interest} + 2\gamma_{energy}, \tag{18}$$

where $\gamma_{pump}$ is the cost of a single pump ($) and $\gamma_{mem}$, $\gamma_{sp}$, and $\gamma_{el}$, are the membrane, spacer, and electrode costs, respectively ($/m$^2$), where $\gamma_{interest}$ is interest cost, $\gamma_{pump}$ is the cost for replacement pumps, $\gamma_{energy}$ is the energy cost, and where, for TC, it is assumed that one pump replacement is required at year 5, and the interest rate is set at 10% with a loan term of 5 years.

In particular embodiments, the total number of revolutions, S, of the spiral can be less than 5 turns.

Figure 6:
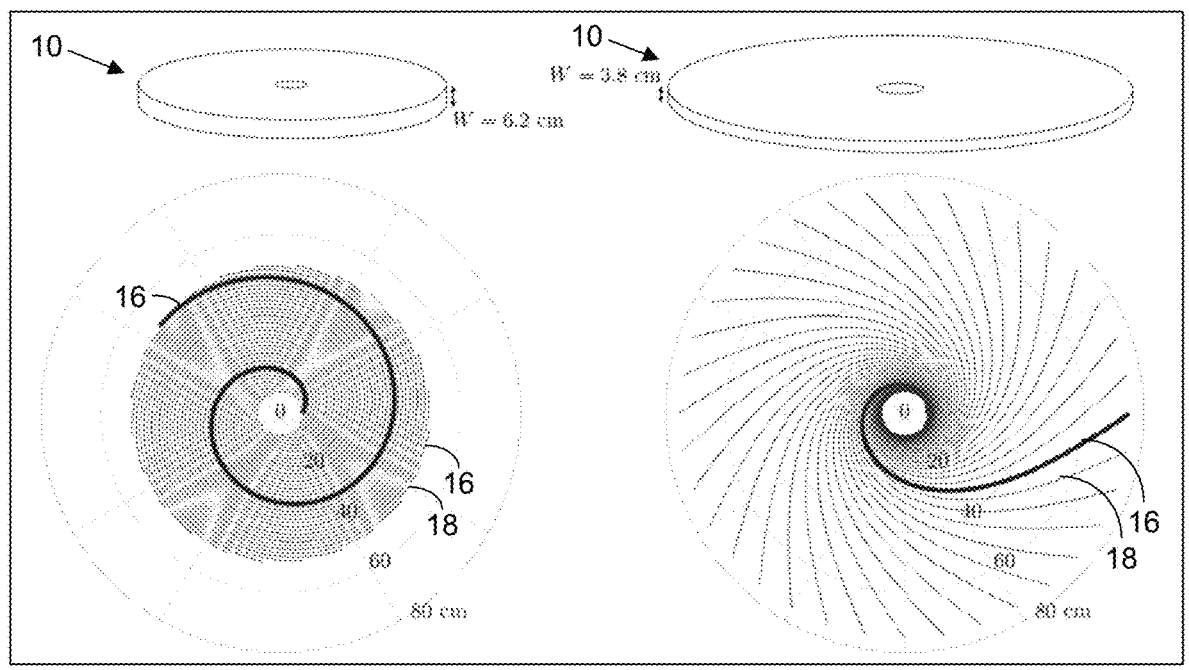
FIG. 6 provides representations of a cost-minimized design of a spiral stack module for a particular feed concentration with an Archimedean spiral of the cation and anion exchange membranes 16 and 18 on the left and an ideal spiral of the cation and anion exchange membranes 16 and 18 on the right.

A representation of the overall spiral stack module (top) and pattern (bottom) for a cost-minimized Archimedean spiral (at left) and an ideal non-Archimedean spiral (at right) are provided in FIG. 6. In both cases, a design in which equal importance is placed on total cost and capital cost is presented. A single membrane 16 is shown in bold and ⅟₁₅th of the total cell pairs are included for visual clarity. Membrane width, W, is shown for the 1000 L/hr case and would scale linearly with production rate.

Figure 7:
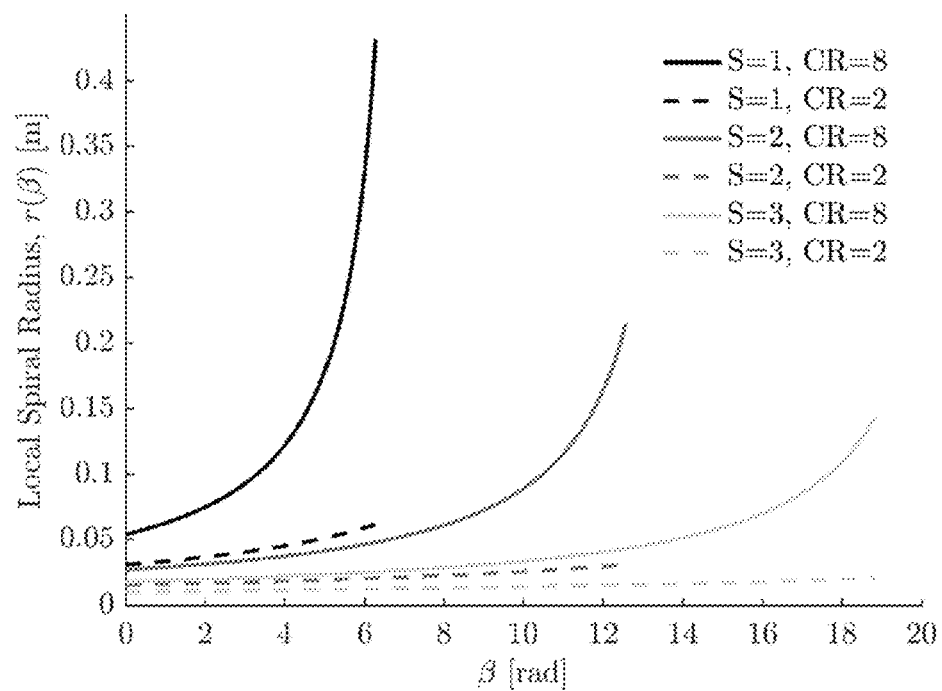
FIG. 7 is a plot of the local radius of the ideal spiral for a particular feed concentration as a function of angle, β, for different numbers of total revolutions, S, and concentration ratios, CR.

The relationship between the spiral angle, β, and the local spiral radius r(β) for various ideal spirals having different numbers of total revolutions, S, and concentration ratios, CR, is shown in FIG. 7. Since stacks designed for the same CR and having the same number of revolutions have the same capital cost, and lower CR stacks have smaller inner and outer electrode radii (FIG. 7), it is prudent to consider the effect of staging multiple smaller CR stacks in series, where the output of the first stage is used as the input to the second stage, and where the output of the second stage is used as the input of the third stage. For example, a single stack with a CR=8 would have the same concentration reduction as three stacks in series, each with CR=2, as long as all stacks had the same number of revolutions. The reduced electrode area in a staged system could make the stack easier to manufacture.

Figure 8:
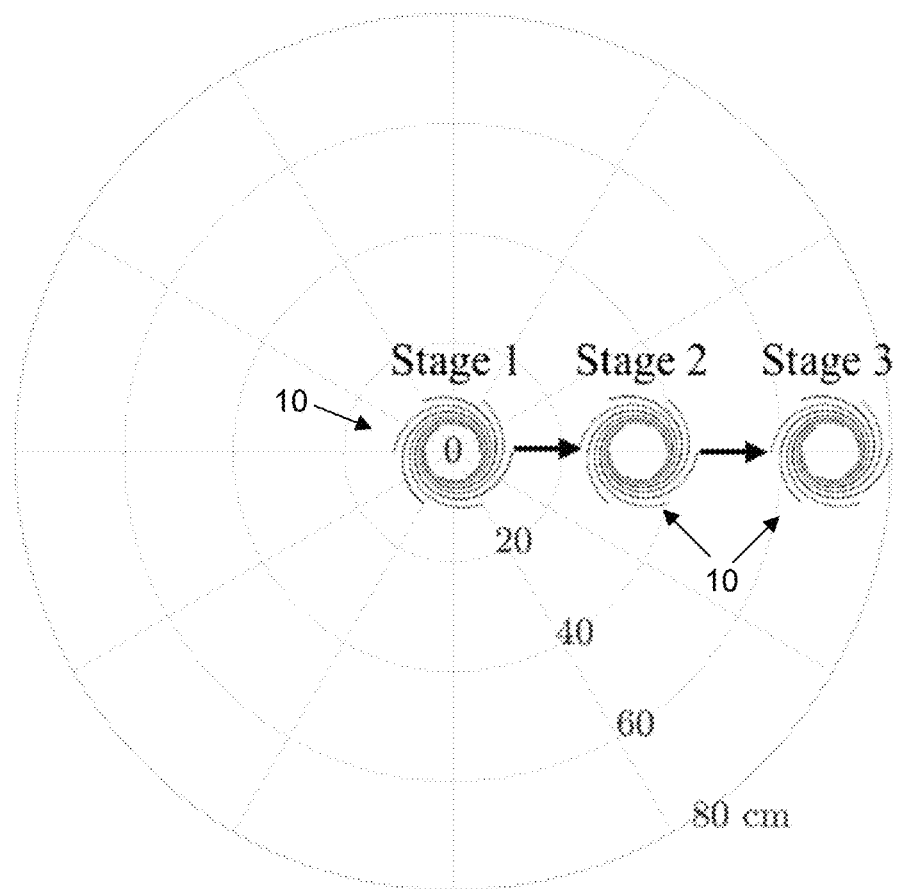
FIG. 8 is a representation of a cost-minimized three-stage ideal spiral pattern for a particular feed concentration, shown on the same grid as the single-stage Archimedean and the ideal spiral shape representations from FIG. 6.

A representation is provided in FIG. 8 of a cost-minimized three-stage ideal spiral pattern, shown on the same grid as the single-stage Archimedean and ideal spiral shape representations from FIG. 8. Note that the inner and outer diameter of each three-stage spiral is substantially smaller than the single-stage designs capable of achieving the same concentration reduction.

Herein, we have thus far discussed a parallel-flow configuration where the feed water divides equally into diluate and concentrate from the center electrode. This configuration becomes difficult to implement as the number of cell pairs (and thus collection tubes at the outer electrode) increases. Additionally, achieving a recovery greater than 50% would require a complicated division of flow at the center electrode, such that the concentrate stream could be recirculated.

A cross-flow spiral configuration avoids both of these concerns by allowing the diluate stream 24 to flow from the inner electrode 12 to outer electrode 14 in a spiral fashion while the concentrate stream flows axially (the direction into the page in FIG. 1). In this configuration, the diluate stream concentration, LCD, and applied current density would still decrease with each successive revolution, as desired. Since the electrical resistance and LCD of the diluate stream 24 is dominant over that of the concentrate, a cross-flow configuration is expected to have minimal effect on the predicted desalination rate and energy consumption. With the two streams hydraulically separated, it would be easier to increase the number of cell pairs and recovery ratio of the system.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A spiral-wound electrodialysis module, comprising:
an inner electrode positioned about a central axis;
an outer electrode surrounding the inner electrode; and
a plurality of ion exchange membranes arranged in a stack, each membrane extending outwardly in a spiral, wherein each spiral extends along an increasing radius, measured from the central axis, from an inner radius proximate the inner electrode to an outer radius proximate the outer electrode, and wherein the radius of each spiral increases at a greater-than-linear rate as a function of an increase of a local spiral angle, β, measured about the central axis along a length of the spiral from a starting angular position at the inner radius toward a final angular position at the outer radius.

2. The spiral-wound electrodialysis module of claim 1, wherein the spiral has a shape that substantially matches the following function:

$$r(\beta) = \frac{r_0}{1 - \beta\left(\frac{1 - CR}{\beta_f}\right)},$$

where r(β) represents local spiral radius as a function of the angle, β; $r_0$ represents a radius of the inner electrode; CR represents concentration ratio; and $\beta_f$ represents angle at an outer end of the spiral.

3. The spiral-wound electrodialysis module of claim 1, wherein the spirals are shaped so as to generate an applied current density that is in a range from 40% of a local limiting current density to the local limiting current density at each location in the stack.

4. The spiral-wound electrodialysis module of claim 1, wherein the spirals are shaped so as to generate an applied current density that is in a range from 60% of a local limiting current density to the local limiting current density at each location in the stack.

5. The spiral-wound electrodialysis module of claim 1, wherein the spirals are shaped so as to generate an applied current density that is in a range from 80% of a local limiting current density to the local limiting current density at each location in the stack.

6. The spiral-wound electrodialysis module of claim 1, wherein the ion exchange membranes comprise a plurality of cation exchange membranes and a plurality of anion exchange membranes, wherein the cation exchange membranes alternate in sequence with the anion exchange membranes.

7. The spiral-wound electrodialysis module of claim 6, wherein channels configured for fluid flow are defined between adjacent membranes, wherein the channels include diluate channels and concentrate channels that alternate in sequence.

8. The spiral-wound electrodialysis module of claim 7, including at least one fluid pump configured to pump a diluate stream to flow from the inner electrode to the outer electrode along a spiral pathway.

9. The spiral-wound electrodialysis module of claim 1, wherein the spirals can be characterized by outward expansion at a greater-than-linear rate as a function of angle, $\beta$, along a length of the spiral from the inner positions to the outer positions.

10. The spiral-wound electrodialysis module of claim 1, wherein the spirals expand over less than five revolutions from the inner to the outer positions.

11. A method for performing electrodialysis using a spiral-wound electrodialysis module, the method comprising:
flowing a feed liquid from a central channel through an inner electrode positioned about a central axis to a plurality of channels, including alternating diluate channels and concentrate channels, defined between ion exchange membranes arranged in a stack, wherein each membrane extends outwardly in a spiral, wherein each spiral extends along an increasing radius, measured from the central axis, from an inner radius proximate the inner electrode to an outer radius proximate an outer electrode, and wherein the radius of each spiral increases at a greater-than-linear rate as a function of an increase of a local spiral angle, $\beta$, measured about the central axis along a length of the spiral from a starting angular position at the inner radius toward a final angular position at the outer radius;
applying a voltage potential across the inner and outer electrodes;
drawing ions via the charges of the electrodes to selectively flow through the ion exchange membranes from the diluate channels into the concentrate channels;
extracting a concentrate solution from the concentrate channels; and
extracting a diluate liquid from the diluate channels, wherein the concentrate channel has a greater salinity than the diluate channel.

12. The method of claim 11, wherein the spiral has a shape that substantially matches the following function:

$$r(\beta) = \frac{r_0}{1 - \beta\left(\frac{1-CR}{\beta_f}\right)},$$

where $r(\beta)$ represents local spiral radius as a function of the angle, $\beta$; $r_0$ represents a radius of the inner electrode; CR represents concentration ratio; and $\beta_f$ represents angle at an outer end of the spiral.

13. The method of claim 11, wherein the electrodes generate an applied current density that is in a range from 40% of a local limiting current density to the local limiting current density at each location in the stack.

14. The method of claim 11, wherein the electrodes generate an applied current density that is in a range from 60% of a local limiting current density to the local limiting current density at each location in the stack.

15. The method of claim 11, wherein the electrodes generate an applied current density that is in a range from 80% of a local limiting current density to the local limiting current density at each location in the stack.

16. The method of claim 11, wherein the ion exchange membranes comprise a plurality of cation exchange membranes and a plurality of anion exchange membranes, wherein the cation exchange membranes alternate in sequence with the anion exchange membranes.

17. The method of claim 16, wherein channels configured for fluid flow are defined between adjacent membranes, wherein the channels include diluate channels and concentrate channels that alternate in sequence.

18. The method of claim 17, including at least one fluid pump configured to pump a diluate stream to flow from the inner electrode to the outer electrode along a spiral pathway and to pump a concentrate stream to flow in a cross-flow orientation to the diluate stream.

19. The method of claim 11, wherein the spirals can be characterized by outward expansion at a greater-than-linear rate as a function of angle, $\beta$, along a length of the spiral from the inner positions to the outer positions.

20. The method of claim 11, wherein the spirals expand over less than five revolutions from the inner to the outer positions.

* * * * *